(12) United States Patent
Hasegawa et al.

(10) Patent No.: US 6,541,557 B1
(45) Date of Patent: Apr. 1, 2003

(54) RESIN COMPOSITE MATERIAL

(75) Inventors: Naoki Hasegawa, Aichi-gun (JP); Arimitsu Usuki, Aichi-gun (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 09/533,072

(22) Filed: Mar. 22, 2000

(30) Foreign Application Priority Data

Mar. 23, 1999 (JP) .......................................... 11-078187

(51) Int. Cl.⁷ ................................................. C08K 3/10
(52) U.S. Cl. ........................ 524/413; 524/439; 524/445
(58) Field of Search ................................. 524/413, 439, 524/445

(56) References Cited

U.S. PATENT DOCUMENTS

| | | | | |
|---|---|---|---|---|
| 4,472,538 A | * | 9/1984 | Kamigaito | ................. 523/202 |
| 4,582,866 A | | 4/1986 | Shain | |
| 5,264,404 A | * | 11/1993 | Takahama | ..................... 502/5 |
| 5,314,683 A | * | 5/1994 | Schlossman | ................ 424/6.3 |
| 5,552,469 A | * | 9/1996 | Beall | .......................... 524/445 |
| 5,840,796 A | * | 11/1998 | Badesha | ..................... 524/449 |
| 5,844,032 A | * | 12/1998 | Serrano | ...................... 524/445 |
| 6,096,803 A | * | 8/2000 | Pinnavaia | ................... 523/209 |
| 6,136,908 A | * | 10/2000 | Liao | ........................... 524/445 |
| 6,271,297 B1 | * | 8/2001 | Ishida | ........................ 524/445 |

FOREIGN PATENT DOCUMENTS

| | | |
|---|---|---|
| DE | 196 62 437 | 8/2000 |
| JP | 60-235858 | 11/1985 |
| JP | 8-333114 | 12/1996 |
| JP | 10-279705 | 10/1998 |
| JP | 2000-88822 | 3/2000 |
| JP | 2000-086822 | 3/2000 |

OTHER PUBLICATIONS

Richard A. Vaia, et al., "Synthesis and Properties of Two–Dimensional Nanostructures by Direct Intercalation of Polymer Melts in Layered Silicates", Chem. Mater., vol. 5, No. 12, 1993, pp. 1694–1696.

* cited by examiner

Primary Examiner—Paul R. Michl
(74) Attorney, Agent, or Firm—Oblon, Spivak, McClelland, Maier & Neustadt, P.C.

(57) ABSTRACT

A resin composite material which allows a polymer phase structure to be controlled is provided.

The material comprises a particle 1 having a surface area of not less than 50 $m^2/g$ and two or more polymers 21 and 22 or a copolymer comprising two or more segments. The polymers or the copolymer form a phase structure 5 having an unit thickness (t) of 1 to 1000 nm and which is laminated on the surface of the particle. It is preferred that the particle has a needle-like, sheet-like, spherical or cylindrical shape and that the copolymer is a block copolymer or a graft copolymer comprising two or more segments.

26 Claims, 9 Drawing Sheets

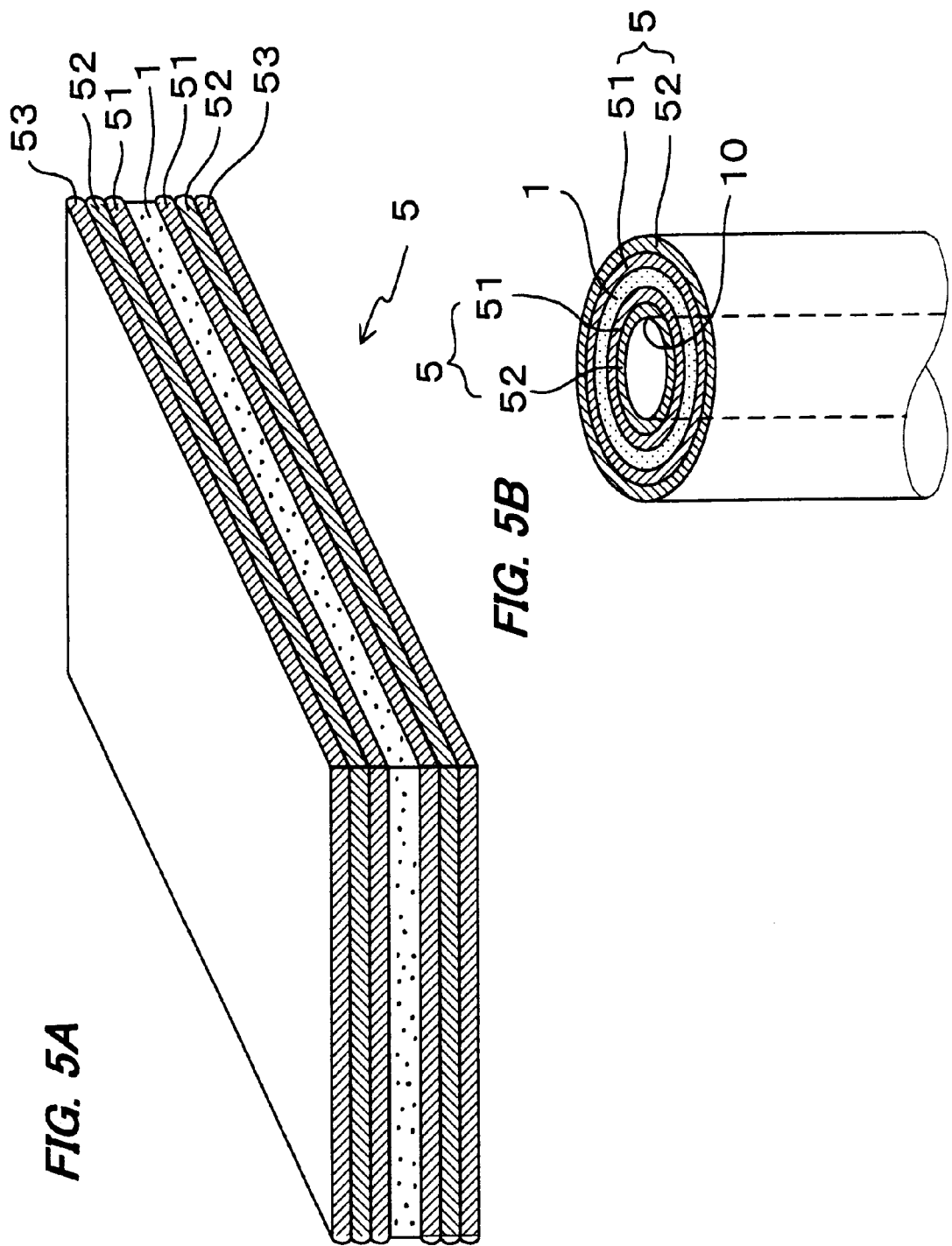

FIG. 9
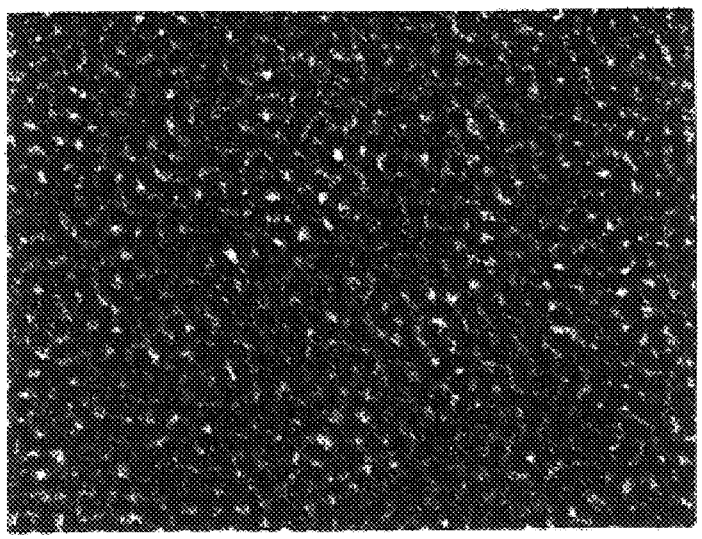
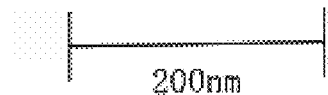

RESIN COMPOSITE MATERIAL

BACKGROUND OF THE INVENTION

1. Field of the Invention

The present invention relates to a resin composite material, in particular, a structure of a resin.

2. Description of the Related Arts

Hitherto, an inorganic material such as clay and talc has been added to a resin in order to improve the properties of the resin.

For example, E. P. Giannelis et al. in Chem. Mater. 5, 1994–1996 (1993) disclose the technique for complexing polystyrene and clay.

In addition, JP-A 8-333114 discloses the techniques for introducing a polar group into a polymer to improve the dispersibility of clay.

The present inventors have been exploiting the techniques for distributing clay into a polymer and have completed an invention directed to control of a phase structure of a polymer.

SUMMARY OF THE INVENTION

The present invention is to providee a resin composite material which allows a polymer phase structure to be controlled.

The present invention is a resin composite material, which comprises a particle having the surface area of not less than 50 $m^2/g$ and at least two or more polymers or a copolymer comprising at least two or more segments, wherein the polymers or the copolymer from a phase structure laminated on the surface of the particle and having an unit thickness of 1 nm to 1000 nm.

Two or more polymers or a copolymer comprising two or more segments (molecular concatemer) have originally such a tendency that heterogeneous polymers or segments separate and homogenous polymers or segments aggregate, and thus a plurality of phases 501 and 502 are randomly dispersed as shown in FIG. 1A. When a particle is introduced into such the polymers or the copolymer having the random phase structure 59, the phase 501 and the phase 502 are successively laminated on the surface of the particle 1 to form a phase structure 5 having the orienting properties as shown in FIG. 1B.

By introducing a particle into a mixture resin matrix of two or more polymers or a copolymer comprising two or more segments, the present invention allows a phase structure of multiple layers composed of the polymers or the copolymer to be controlled.

Although two kinds of phases 501 and 502 are exemplified in FIG. 1A and FIG. 1B, three or more phases may be used.

In the present invention, two or more polymers have such the tendency that homogenous polymers aggregate and cause a phase separation. A copolymer comprising two or more segments also has such the tendency that homogenous segments aggregate and cause a phase separation between heterogeneous segments.

As used herein, "phase separation" refers to the properties where homogenous polymers or homogenous segments of a copolymer aggregate mutually, and heterogeneous polymers or heterogeneous segments separate.

Two or more polymers or a copolymer causing a phase separation exert the self-organizing ability around a particle to form a phase structure with a particle as a core and having the orienting properties.

This phase structure having the orienting properties is a structure in which homogenous polymers or homogenous segments in a copolymer aggregate mutually to form phases successively laminated around a particle.

When a resin composite material of the present invention comprises a particle 1 and two kinds of polymers 21 and 22 (FIG. 2A), among polymers, the polymer 21 having the higher affinity with the particle 1 is first arranged on the surface of the particle 1 to form the first phase 51 (FIG. 2B). Subsequently, the polymer 22 having the lower affinity with the particle 1 is arranged on the surface of the first phase 51 to form the second phase 52. Subsequently, as necessary, the same polymer 21 as the polymer 21 which formed the first phase 51 is arranged on the surface of the second layer 52 to form the third phase 53. This is repeated to form a phase structure 5 in which polymers 21 and 22 are laminated on the surface of the particle 1 as shown in FIG. 2B.

When a resin composite material of the present invention comprises a particle 1 and a copolymer 3 comprising two kinds of segments 31 and 32 (FIG. 3A), among the segments, the segment 31 having the higher affinity with the particle 1 is arranged on the surface of the particle 1 to form the first phase 51 (FIG. 3B). Subsequently, other segments 32 arranged adjacent the segments 31 which formed the first phase 51 are mutually arranged to form the second phase 52.

And, phase structures each corresponding to the kind of a segment of a copolymer are repeated. For example, as shown in FIG. 3B, in the case of a copolymer 3 comprising two kinds of segments 31 and 32, two kinds of phases 501 and 502 are repeated. When a copolymer 3 comprises three kinds of segments 31, 32 and 33 as shown in FIG. 4, three kinds of phases 501, 502 and 503 are repeated.

A phase structure formed on the surface of a particle comprises only one phase in some cases, or two phases or three phases or more in some cases. How many layers of a phase structure are formed can be controlled by the number of kinds of polymers, the number of kinds of segments of a copolymer, the order of repetition of segments and the like. This can also be controlled by the molding conditions upon molding a resin composite material at the state of the high molecular mobility such as the molten state or the like.

The shape of a particle is mainly a factor which determines the orientation of a phase structure. Size of a polymer or size of a segment of a copolymer is a main factor which determines an unit thickness of each phase in a phase structure.

Therefore, the phase structure can be controlled by selecting the shape of a particle, size of a polymer or size of a segment of a copolymer, or the like.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5A is an illustration of a plate-like particle in the present invention;

FIG. 5B is an illustration of a cylindrical particle in the present invention;

FIG. 9 is a photograph substituting for a drawing of a transmission electron microgram (magnification: 150,000) for showing the structure of a resin material of Comparative Example 1.

DESCRIPTION OF THE PREFERRED EMBODIMENTS

Figure 1:
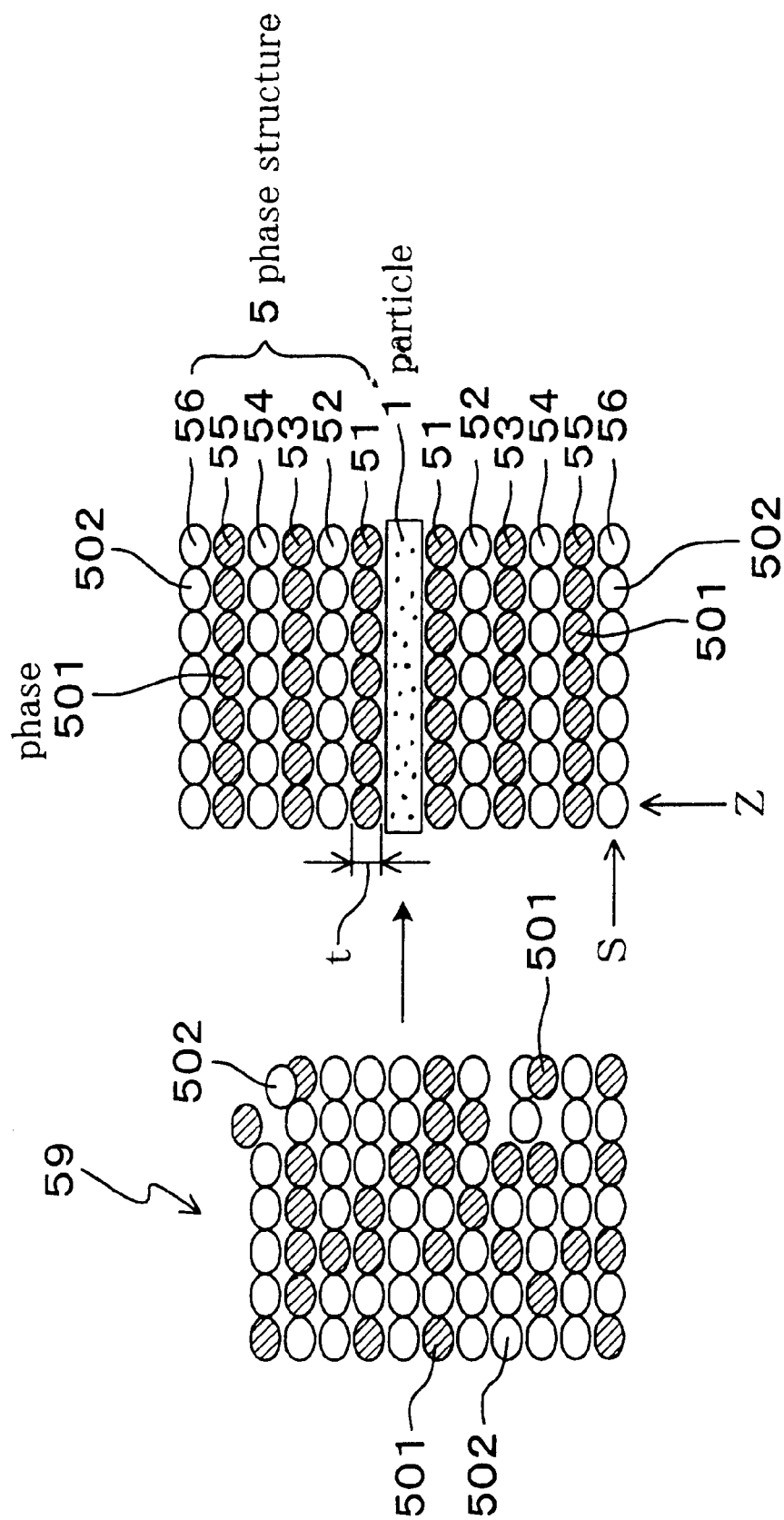
FIG. 1A is an illustration of a random phase structure before completing.
FIG. 1B is an illustration of a phase structure in a resin composite material of the present invention.
Figure 2:
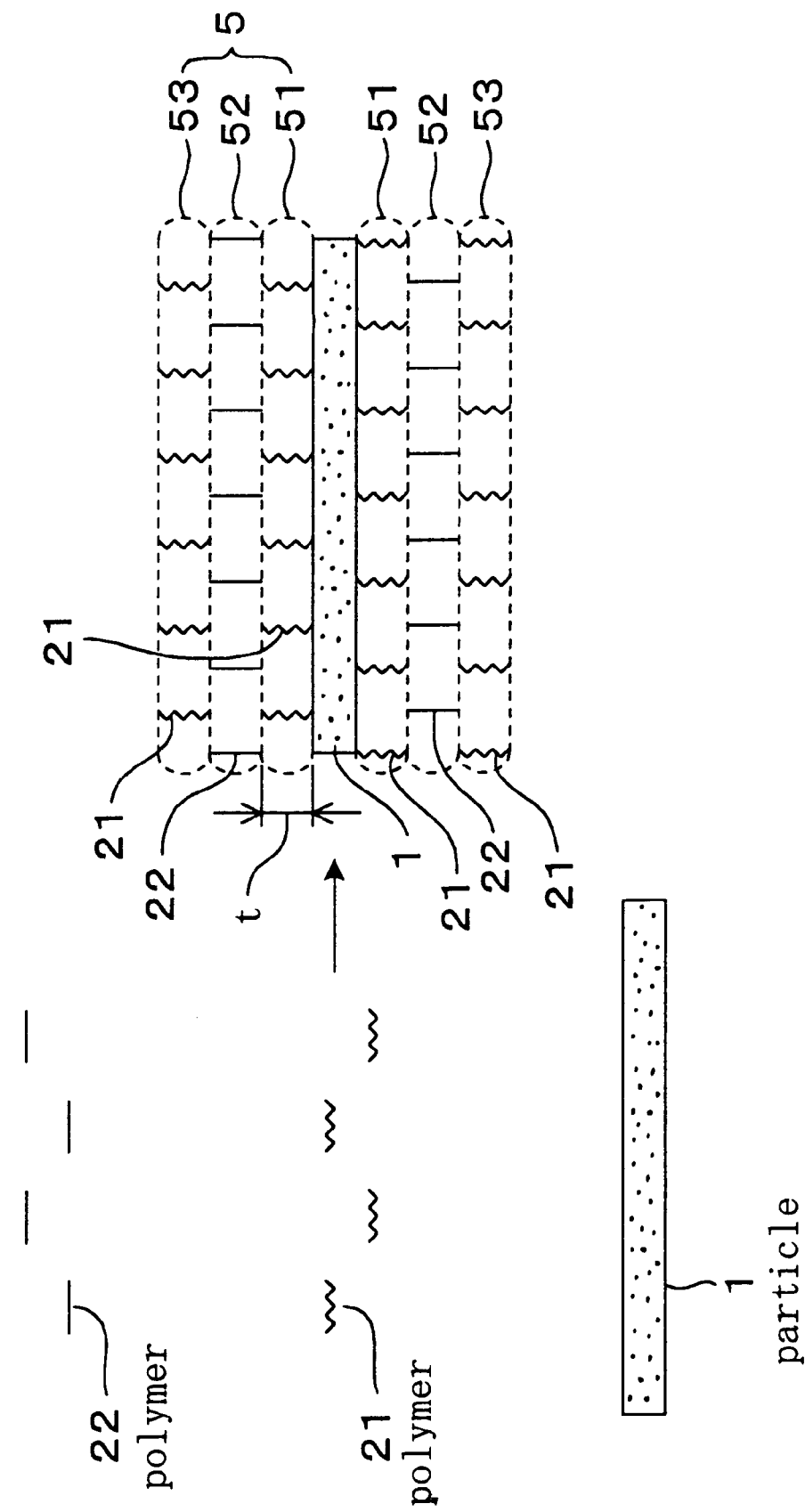
FIG. 2A is an illustration of a particle and two kinds of polymers before complexing.
FIG. 2B is an illustration of a phase structure of two kinds of polymers of the present invention.
Figure 3:
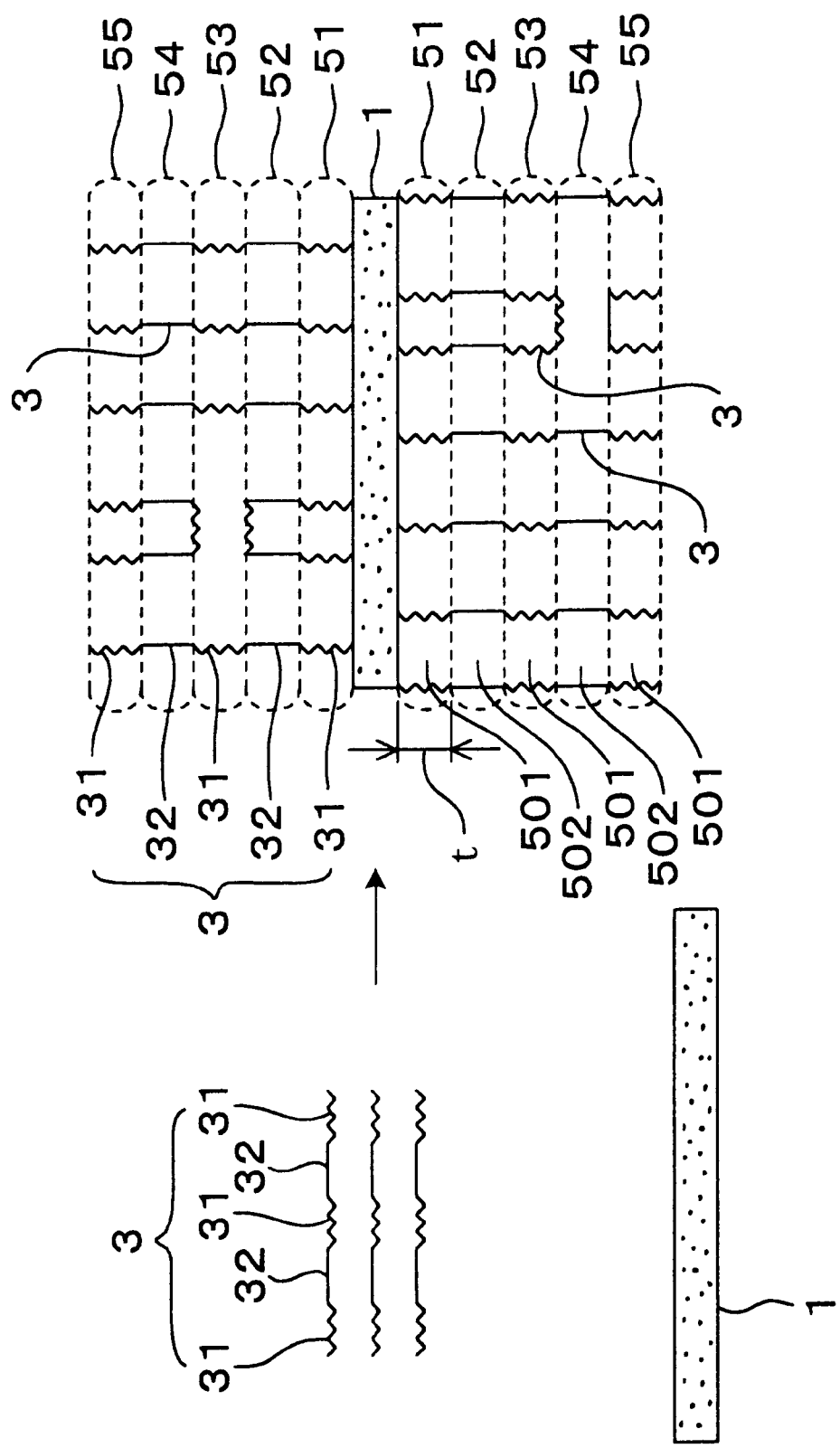
FIG. 3A is an illustration of a particle and a copolymer comprising two kinds of segments before complexing.
FIG. 3B is an illustration of a phase structure of a copolymer comprising two kinds of segments of the present invention.
Figure 4:
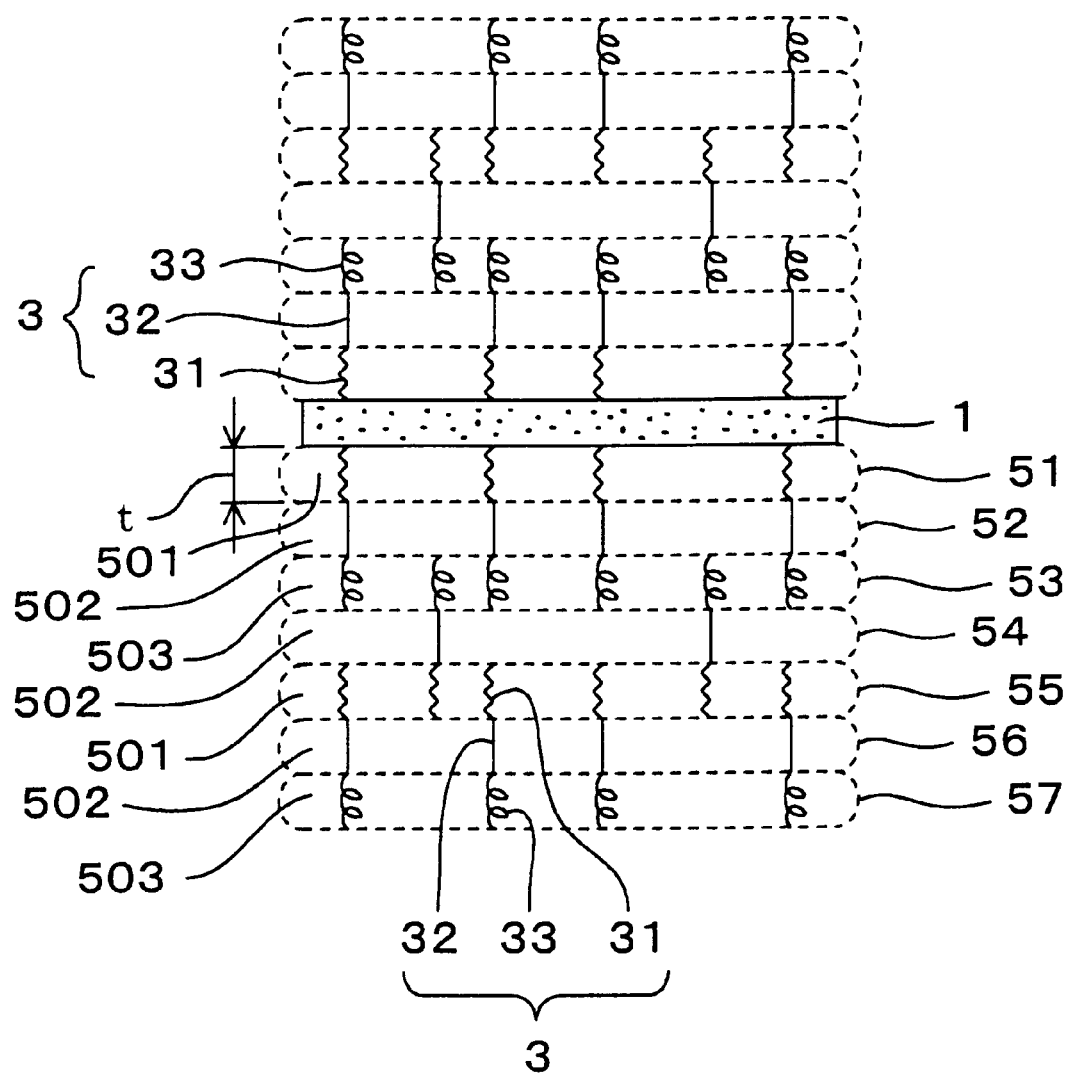
FIG. 4 is an illustration of a phase structure of a copolymer comprising three kinds of segments of the present invention.

In the present invention, a phase structure around a particle is formed when the surface area of a particle is 50 $m^2/g$ or more. When the surface area is less than 50 $m^2/g$, an amount of an interface between the particle and polymers or a copolymer is small and a phase structure can not be controlled well.

Preferably, the surface area of a particle is 100 $m^2/g$ or more and, more preferably 200 $m^2/g$ or more. When the surface area is within this range, the phase structure can be controlled well.

The surface area of a particle refers to an value of the surface area of the particle divided by the weight of the particle.

As shown in FIG. 1A to FIG. 4, polymers or a copolymer forms a phase structure 5 having an unit thickness (t) of 1 nm to 1000 nm and, more preferably 3 nm to 1000 nm around a particle 1. As used herein, an unit thickness t refers to a thickness of one phase formed by mutual aggregation of homogenous polymers or segments in a copolymer.

When an unit thickness t is less than 1 nm, since an interaction between polymers or segments is small, the property as a polymer or a segment, that is phase separation, can not be sufficiently obtained. When t is 3 nm or more, since an interaction between polymers or segments becomes stronger, the property as a polymer or a segment is well exerted. On the other hand, when t exceeds 1000 nm, formation of a phase structure around a particle becomes difficult.

Preferably, an unit thickness t of a phase structure is 5 nm to 1000 nm and, more preferably 5 to 500 nm. By this, controlling of a phase structure becomes easier and a phase structure having the orienting properties is formed.

A unit thickness t of a phase structure depends upon a combination of two or more polymers or segments in a copolymer, their molecular weight, molecular mobility and the like.

In the present invention, the phase structure is not required to be formed throughout the resin composite material but the phase structure may be formed in at least a part of the material.

It is desirable that the phase structure is contained in the polymers or the copolymer in an amount of 25 to 100% by weight. In this range, the function of the phase structure is easily exerted. From the foregoing, the polymers or the copolymer in the present invention have a part in which an arrangement of resin molecules is controlled by the particle.

It is preferable that the particle has a needle-like, sheet-like, spherical or cylindrical shape. In this case, a phase structure can be controlled. For example, as shown in FIG. 5A, in the case of a sheet-like particle 1, a phase structure 5 in which multiple phases (for example, the first to the fifth phases 51–55) are laminated on its upper and lower planes is formed. As shown in FIG. 5B, in the case of a cylindrical particle 1 having a hollow part 10, a phase structure 5 in which multiple phases are laminated on its inner and external planes is formed.

Figure 6A:
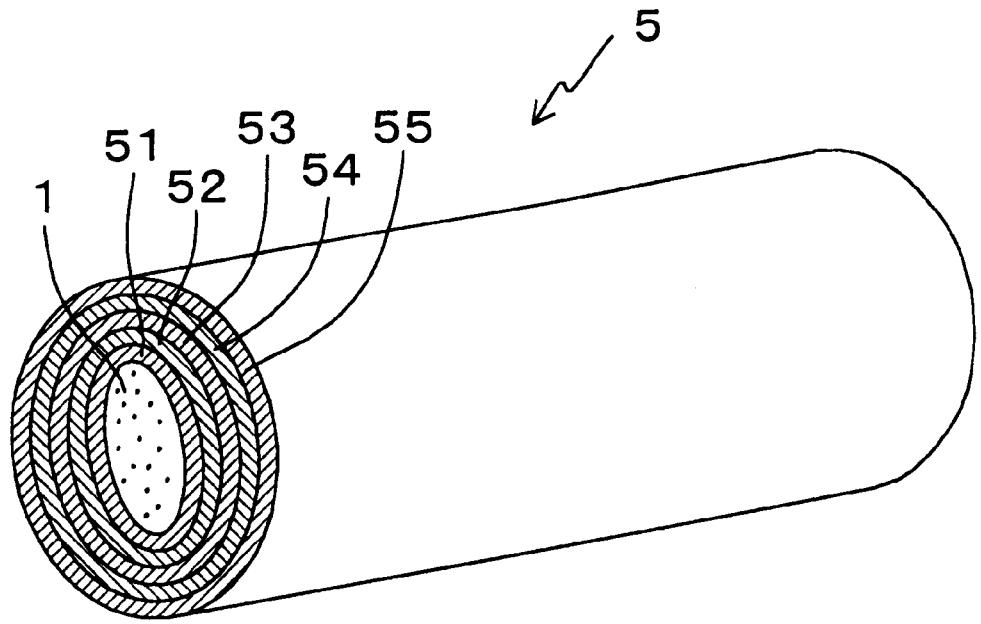
FIG. 6A is an illustration of a needle-like particle in the present invention.
Figure 6B:
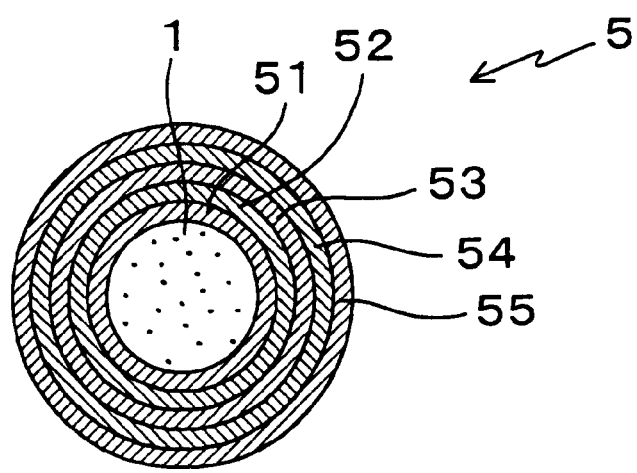
FIG. 6B is an illustration of a spherical particle in the present invention.

In the cases of a needle-like particle 1 (FIG. 6A) and a spherical particle 1 (FIG. 6B), a phase structure 5 in which multiple phases are laminated on its surface is formed.

The shape of a particle is not limited to them but may be other steric, hollow or plane one, or indefinite one. Even in the case of any shape, a variety of phase structures are formed around a particle.

A material for a particle may be any one. For example, a particle may be inorganic or organic material. As an inorganic material, there are metal, ceramic, clay, carbon compound and the like.

As a metal, there are a typical metal such as aluminum, silicon, calcium and potassium, and a transition metal such as iron, cobalt, copper and gold. The metal may be an alloy of metals.

As a ceramic, for example, there are so-called silicon compound, metal oxide, metal sulfide and metal nitride containing an element such as silicon, oxygen, sulfur and nitrogen.

The surfaces of these metal and ceramic may be treated with an organic compound in order to improve the affinity with the polymers or the copolymer.

Clay has an or no exchangeable ion.

Examples of clay having an exchangeable ion are not limited to but include kaolinite group such as kaolinite, halloysite and the like; smectite group such as montmorillonite, videlite, saponite, hectolite, mica and the like; and vermiculite group. Clay may be natural clay, clay obtained by treating natural clay, or synthetic clay such as swellable fluorinated mica.

It is preferable that clay having an exchangeable ion is organized clay with an organic substance adsorbed and/or binded to the surface thereof obtained by treating the clay with an organic substance. In particular, it is preferable that organic onium is binded to the surface of clay. This is because it makes it easier to control a phase structure.

It is preferable that an ion exchange amount of clay having an exchangeable ion is 50 to 200 meq/100 g. When it is less than 50 meq/100 g, exchange of a cation of clay with an organic onium ion may not be sufficiently performed. When ion exchange amount exceeds 200 meq/100 g, the binding force between clay layers becomes stronger and swelling between clay layers may become difficult.

Examples of organic onium ion include hexylammonium ion, octylammonium ion, decylammonium ion, dodecylammonium ion, tetradecylammonium ion, hexadecylammonium ion, octadecylamonium ion, hexyltrimethylammonium ion, octyltrimethylammonium ion, decyltrimethylammonium ion, dodecyltrimethylammonium ion, tetradecyltrimethylammonium ion, hexadecyltrimethylammonium ion, octadecyltrimethylammonium ion, dodecyldimethylammonium ion, dodecylmethylamonium ion and the like.

Further examples include layer-like polysilicate salt such as kaneamite, magadiite, ailamite, kenyaite, makatite and the like.

Examples of clay having no exchangeable ion include allophane having the spherical structure, imogolite having the cylindrical structure, cepiolite and the like. Alternatively, the surfaces of them may be treated with an organic substance to increase the affinity with polymers or a copolymer.

Examples of a carbon compound include activated carbon, graphite, flarene, carbon nanotube, carbon fiber and the like.

Examples of an organic substance include latex, crossliked polymer and the like. An organic substance may be a low-molecular organic crystal.

Two or more polymers or a copolymer having two or more segments have such the tendency that homogenous polymers or homogenous segments aggregate mutually to cause phase separation. Such the phase separating properties are generated from difference in an aggregating force between polymers or segments, difference in an electrical interaction, difference in a separating rate due to crystallization and the like and difference in an affinity with a particle.

Two or more polymers can be combined from the following polymers.

There are polyamide, polyurethane, polyurea, polycarbonate, polyacetal, polyester, polyarylate, polyphenylene ether, polyphenylene sulfide, polyethylene, polypropylene, polybutene, polypentene, ethylene-propylene copolymer, ethylene-butene copolymer, polybutadiene, polyisoprene, hydrogenated polybutadiene, hydrogenated polyisoprene, ethylene-propylene-diene copolymer, ethylene-butene-diene copolymer, butyl rubber, polystyrene, styrene-butadiene copolymer, styrene-hydrogenated butadiene copolymer, polyether, polysulfone, polyketone, polyphthalamide, polyethernitrile, polybenzimidazole, polyimide, polycarbodiimide, fluorinated polymer such as polytetrafluorinated ethylene and the like, polyamideimide, polyetherimide, liquid crystal polymer, polysilane, silicone polymer such as polysiloxane and the like, and acrylic polymer such as polymethyl methacrylate(hereinafter referred to as PMMA).

Preferable examples of a combination of two or more polymers include polyphenylene oxide and polystyrene, polypropylene and ethylene-propylene rubber, polypropylene and polybutene, polypropylene and styrene butadiene rubber, and polypropylene and hydrogenated styrene butadiene rubber.

As a copolymer having two or more segments, for example, there is a copolymer obtained by polymerizing the following two or more segments. That is, examples of such the segment include polyamide, polyurethane, polyurea, polycarbonate, polyacetal, polyester, polyarylate, polyphenylene ether, polyphenylene sulfide, polyethylene, polypropylene, polybutene, polypentene, ethylene-propylene copolymer, ethylene-butene copolymer, polybutadiene, polyisoprene, hydrogenated polybutadiene, hydrogenated polyisoprene, ethylene-propylene-diene copolymer, ethylene-butene-diene copolymer, butyl rubber, polystyrene, styrene-butadiene copolymer, styrene-hydrogenated butadiene copolymer, polyether, polysulfone, polyketone, polyphthalamide, polyethernitrile, polybenzimidazole, polyimide, polycarbodiimide, fluorinated polymer such as polytetrafluorinated ethylene and the like, polyamideimide, polyetherimide, liquid crystal polymer, polysilane, silicone polymer such as polysiloxane and the like, and acrylic polymer such as PMMA.

Particular examples include polystyrene, polyamide, polyurethane, polyester, polybutadiene, hydrogenated polybutadiene, polyisoprene, hydrogenated polyisoprene, and polyether.

As a structure of the copolymer having two or more segments, a block copolymer and a graft copolymer can be listed.

Examples of a commercially available copolymer having two or more segments include Tuftec (Asahi Chemical), Hytrel (Toray, Dupont), Pelprene (Toyobo), Grilux (JSR), Pebax (Toray), Daiamid (Daisel, Hules), and Estran (Takeda Bardishurethene Kogyo).

It is preferred that number-average molecular weight of two or more polymers and a copolymer of two or more segments is 5,000 to 10,000,000. When it is less than 5,000, there is a possibility that the processing properties of a resin composite material are lowered. When it exceeds 10,000,000, there is a possibility that the mechanical properties of a resin composite material are lowered. It is preferable that the molecular weight is more preferably 5,000 to 1,000,000 and, in particular, 10,000 to 500,000. In this case, the processing properties and the mechanical properties are improved.

It is preferred that the content of a particle is 0.1 to 200 parts by weight relative to 100 parts by weight of polymers or a copolymer. When it is less than 0.1 part by weight, or when it exceeds 200 parts by weight, there is a possibility that controlling of a phase structure becomes difficult. It is preferred that the content of a particle is 0.1 to 30 parts by weight relative to 100 parts by weight of the polymer or the copolymer. In this case, such the effects are further improved that the entire resin composite material is regularly controlled and a material having the balanced properties as a polymer or a segment is obtained.

In order to control a phase structure with a less amount of particles, it is preferred that particles are finely dispersed in polymers or a copolymer.

When a particle is layered clay, in order to disperse the layered clay finely, it is preferred that polymers or a copolymer is intercalated between layered clays. "Intercalation" refers to the state where a distance between layers of layered clay becomes wider than the original distance between layers of layered clay before complexing polymers or a copolymer with a layered clay. Whether intercalated or not can be determined by X-ray diffraction analysis. By intercalation, an amount of an interface between the surface of layered clay and polymers or a copolymer is enlarged and formation of a phase structure becomes easy.

More preferably, a distance between layers after complexing is widened than a distance between layers before complexing by 10 A (angstrom) or more. Further preferably, a distance between layers is widened than that before complexing by 20 A (angstrom) or more. More preferably, a distance between layers is widened than that before complexing by 100 A (angstrom) or more. Particularly preferably, the layered phase structure of layered clay is lost, leading to molecular dispersion in a monolayer.

Figure 7:
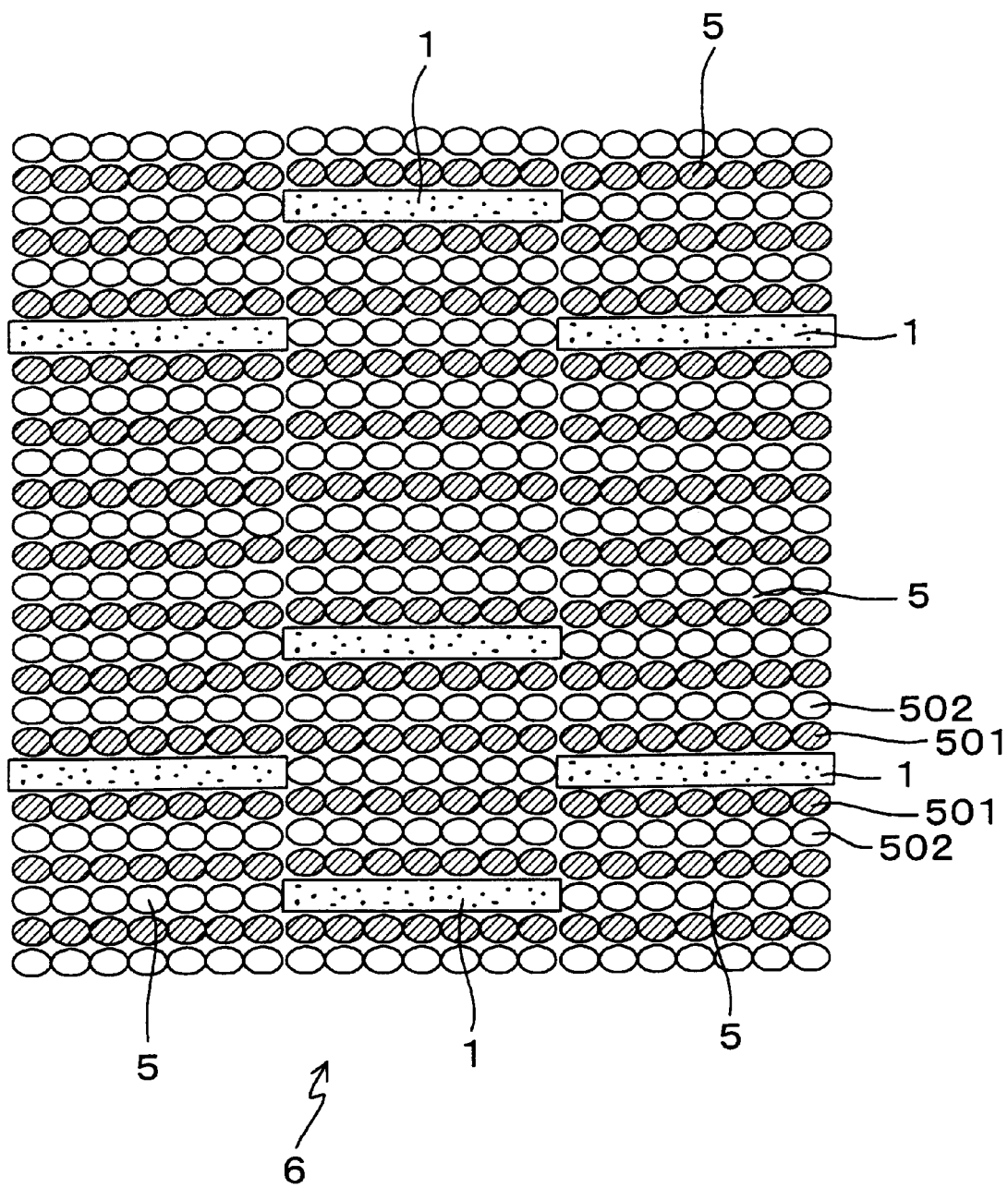
FIG. 7 is an illustration of a phase structure of a resin composite material in the present invention.

Upon preparation of a resin composite material of the present invention, it is preferable that particles each having a surface area of not less than 50 m²/g and at least two polymers or a copolymer having at least two segments are melt-blended, and then resulting composite material is injection-molded or expanded to orient the particles. In this case, the particles of a resin composite material are oriented and, thus, the entire structure of a resin composite material can be controlled. That is, as shown in FIG. 7, particles 1 in a resin composite material 6 are oriented in a certain direction and phase structures 5 formed on their surfaces are also oriented in the same direction. Thus, a novel function can be imparted and the mechanical properties can be improved.

A resin composite material of the present invention can be utilized for a vibration damping or vibration isolating material, an electrically conductive material, a film material, an optical material and an anti-magnetic material.

More particularly, regarding utilization of a resin composite material for a vibration damping or vibration isolating material, for example, one of two polymers is a soft polymer and the other is a hard polymer, or one of segments of a copolymer comprising two segments is a soft segment and the other is a hard segment. In this case, when these are blended with particles, a soft phase and a hard phase are formed alternately in a direction along the surface of a particle (direction of an arrow S in FIG. 1B) as shown in FIG. 1B. When such the resin composite material is arranged in a vibration field, a soft phase absorb the vibration and the vibration damping and vibration isolating properties are exerted.

Regarding utilization of a resin composite material for an electrically conductive material, for example, one of two polymers is an electrically conductive polymer and the other is non-electrically conductive polymer, or one of segments of a copolymer comprising two segments is an electrically conductive segment and the other is non-electrically conductive segment. In this case, when these are blended with particles, an electrically conductive phase and a non-electrically conductive phase are formed alternately in a direction along the surface of a particle (direction of an arrow S in FIG. 1B). Such the resin composite material has the electrically conductive properties due to electrical flow in a direction along the surface of a particle but has the electrically insulating properties due to lack of electrical flow in a direction along a direction vertical to a particle. That is, such the resin composite material functions as an electrically conductive anisotropic material.

Polymers or a copolymer having the phase separating properties is introduced between a metal phase and a metal phase, a semiconductor phase and a metal phase, a semiconductor phase and a semiconductor phase and, thus, a phase structure of the polymers or the copolymer can be controlled on the surface thereof.

Regarding utilization of a resin composite material for a film material, for example, one of two polymers is a polymer having the gas barrier properties and the other is a polymer as a matrix, one of segments of a copolymer comprising two segments is a segment having the gas barrier properties and the other is a segment as a matrix. In this case, such the function can be imparted that a gas is permeated in a direction along the surface of a particle (S direction in FIG. 1B) but a gas is blocked in a vertical direction (Z direction in FIG. 1B). Since a phase structure can be controlled in a nanometer level, such the material can be utilized as a substitute for a multi-layered film.

Regarding utilization of a resin composite material for an optical material, for example, a phase structure is formed on the surface of a particle with two polymers or a copolymer comprising two segments, each having the different refractive index. In this case, since the light (electromagnetic wave) is interfered due to the oriented properties of a phase structure, the material can be used as a birefringent membrane.

When a resin composite material having a phase structure controlled by particles is added to a polymer having no controlled phase structure, a novel composite material can be further prepared.

As a polymer having no controlled structure(phase structure), there are polymers such as polyamide, polyester, polyphenylene oxide, polyacetal, polyphenylene sulfide, polycarbonate, epoxy resin, phenol resin, polypropylene, polyethylene, ethylene-propylene copolymer, polystyrene and the like. In particular, a composite material of the present invention comprising an elastomer system block copolymer has improved impact-resistance. In this case, an amount of a composite material is preferably 1 parts by weight to 100 parts by weight and, more preferably 3 parts by weight to 50 parts by weight and, further preferably 5 parts by weight to 30 parts by weight with respect to 100 parts by weight of the polymer having no phase structure. In particular, as an elastomer system block copolymer, a styrene system block copolymer comprising styrene-butadiene or styrene-hydrogenated butadiene, and an amide system block copolymer are preferable. As a particle to be added, clay, in particular, clay treated with an organic substance such as an onium salt or the like is preferably used.

A resin composite material of the present invention can be processed into a molded product by injection molding, extrusion molding, press molding and blow molding.

Embodiments

Examples 1 to 5 relating to aspects of the present invention and Comparative Examples 1 to 3 will be explained.

EXAMPLE 1

A resin composite material of this example comprised a copolymer and particles. As the copolymer, Tuftec H1013 (manufactured by Asahi Chemical) was used. As the particles, organized montmorilonite was used. The organized montmorilonite was plate-like clay having a size of 100 nm×1 nm and surface area of 800 m²/g.

Upon preparation of the organized montmorilonite, Namontmorilonite (trade name: Knipia F) manufactured by Kniminekogyo as layered clay was first prepared. 80 g of Na-montmorilonite was dispersed in 5000 ml of water at 80° C. 28.5 g of octadecylamine and 11 ml of concentrated hydrochloric acid were dissolved in 2000 ml of water at 80° C., and the solution was added to the dispersion of montmorilonite. The precipitates were filtered, washed with water at 80° C. three times and lyophilized to obtain montmorilonite organized with octadecylammonium.

Then, the organized montmorilonite (38.4 g) was added to Tuftec H1013 (400 g) and melted to blend with a twin-screw extruder. A blending temperature was 200° C., an axial rotation number was 200 rpm and the inorganic content obtained by a scorching-remaining method was 5% by weight.

Thus, the resin composite material of this example was obtained.

Figure 8:
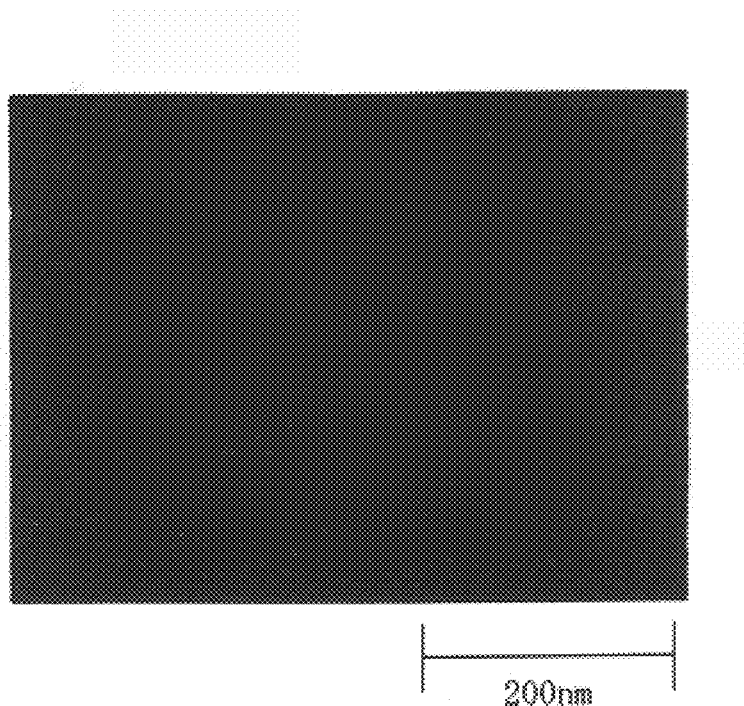
FIG. 8 is a photograph substituting for a drawing of a transmission electron microgram (magnification: 150,000) for showing the structure of a resin composite material of Example 1.

When the resulting resin composite material was examined with a transmission electron microscope, a layered phase structure having a unit thickness of around 10 nm was observed in which a structure of a copolymer (Tuftec) was controlled around dispersed montmorilonite layer (black part longer in a transversal direction) and a plurality of phases (segment, black and white pattern in a transversal direction) were laminated on the surface of the layer as shown in FIG. 8. There is a longitudinally striped vague part of an image in FIG. 8, but this was generated by treatment for converting into electronic data and, thus, there is no relationship with a phase structure.

EXAMPLE 2

As a particle, organized allophane was used. The organized allophane was a spherical clay having a diameter of 5 nm and surface area of 770 m$^2$/g. Upon treatment of allophane with an organic substance, 30 g of hexyltriethoxysilane was added to 100 g of allophane dispersed in 1000 g of water, 10 ml of dilute hydrochloric acid was added thereto, stirred at 80° C. for 2 hours, then filtrated and dried.

As the copolymer, Tuftec H1013 was used as in Example 1.

Then, the organized allophane (30 g) was added to Tuftec H1013 (400 g) and melted to blend with a twin-screw extruder. A blending temperature was 200° C., an axial rotation number was 200 rpm and the inorganic content obtained by a schorching-remaining method was 7% by weight.

Thus, the resin composite material of this example was obtained.

When the resultant resin composite material was examined with a transmission electron microscope, a spherical phase structure having an unit thickness of around 10 nm in which a structure of a copolymer (Tuftec) was controlled around the dispersed spherical allophane and a plurality of phases (segment) were laminated was observed.

EXAMPLE 3

As a particle, organized imogolite was used. The organized imogolite was a cylindrical clay having a diameter 3 nm and surface area of 740 m$^2$/g. Upon treatment of imogolite with an organic substance, 30 g of hydroxypropyltriethoxysilane was added to 100 g of imogolite dispersed in 1000 g of water, 10 ml of dilute hydrochloric acid was added thereto, stirred at 80° C. for 2 hours, filtered and dried.

As the copolymer, Tuftec H1013 was used as in Example 1.

Then, the organized imogolite (30 g) was added to Tuftec H1013 (400 g) and melted to blend with a twin-screw extruder. A blending temperature was 200° C., an axial rotation number was 200 rpm and the inorganic content obtained by a schorching method was 7% by weight.

Thus, the resin composite material of this example was obtained.

When the resultant resin composite material was examined with a transmission electron microscope, a cylindrical (needle-like) phase structure having an unit thickness of around 10 nm in which a structure of a copolymer (Tuftec) was controlled around the dispersed cylindrical (needle-like) imogolite and a plurality of phases (segment) were laminated was observed.

EXAMPLE 4

As a particle, the same montmorilonite as that of Example 1 (surface area 800 m$^2$/g) was used.

As a copolymer, Daiamid (Disel, Hules) was used.

And, the organized montmorilonite (38.4 g) was added to Daiamid (400 g) and melted to blend with a twin-screw extruder. A blending temperature was 250° C., an axial rotation number was 200 rpm and the inorganic content obtained by a schorching remaining method was 5% by weight.

Thus, the resin composite material of this example was obtained.

When the resultant resin composite material was examined with a transmission electron microscope, a layered phase structure having an unit thickness of around 5 to 10 nm in which a structure of a copolymer (Daiamid) was controlled by the dispersed layered montmorilonite and a plurality of phases were laminated was observed.

EXAMPLE 5

As a particle, the same montmorilonite as that of Example 1 (surface area 800 m$^2$ /g) was used. As a copolymer, Estran C95A (Takeda Verdishurethanekogyo) was used.

And, the organized montmorilonite (38.4 g) was added to Estran C95A (400 g) and melted to blend with a twin-screw extruder. A blending temperature was 220° C., an axial rotation number was 200 rpm and the inorganic content obtained by a schorching-remaining method was 5% by weight.

Thus, the resin composite material of this example was obtained.

When the resultant resin composite material was examined with a transmission electron microscope, a layered phase structure having an unit thickness of around 5 to 10 nm in which a structure of a copolymer (Estran) was controlled by the dispersed layered montmorilonite and a plurality of phases were laminated was observed.

EXAMPLE 6

60 g of the composite material obtained in Example 1 and 140 g of polypropylene (PP) we remelted to blend with a twin-screw extruder. A blending temperature was 200° C., and an axial rotation number was 200 rpm.

When the resultant composite material was examined with a transmission electron microscope, a styrene-butadiene copolymer was dispersed in PP in an order of submicron. A layered phase structure having an unit thickness of around 10 nm in which a structure of a copolymer was controlled around dispersed montmorilonite and a plurality of phases were laminated was observed in a styrene-butadiene copolymer phase.

EXAMPLE 7

60 g of the composite material obtained in Example 1 and 140 g of polyphenylene oxide/polystyrene alloy were melted to blend with a twin-screw extruder. A blending temperature was 300° C., and an axial rotation number was 200 rpm.

When the resultant composite material was examined with a transmission electron microscope, a styrene-butadiene copolymer was dispersed in polyphenylene oxide/polystyrene alloy in an order of submicron. A layered phase structure having an unit thickness of around 10 nm in which a structure of a copolymer was controlled around dispersed montmorilonite and a plurality of phases were laminated was observed in a styrene-butadiene copolymer phase.

EXAMPLE 8

60 g of the composite material obtained in Example 4 and 140 g of nylon 6 were melted to blend with a twin-screw extruder. A blending temperature was 250° C., and an axial rotation number was 200 rpm.

When the resultant composite material was examined with a transmission electron microscope, an amide system copolymer was dispersed in nylon 6 in an order of submicron. A layered phase structure having an unit thickness of around 10 nm in which a structure of a copolymer was controlled around dispersed montmorilonite and a plurality of phases were laminated was observed in an amide system copolymer phase.

EXAMPLE 9

60 g of the composite material obtained in Example 4 and 140 g of nylon 6 were melted to blend with a twin-screw extruder. A blending temperature was 280° C., and an axial rotation number was 200 rpm.

When the resultant composite material was examined with a transmission electron microscope, an amide system copolymer was dispersed in nylon 66 in an order of submicron. A layered phase structure having an unit thickness of around 10 nm in which a structure of a copolymer was controlled around dispersed montmorilonite and a plurality of phases were laminated was observed in an amide system copolymer phase.

Comparative Example 1

A resin material composed of only a copolymer was prepared without addition of a particle. As a copolymer, Tuftec H1013 (manufactured by Asahi Chemical) was used.

A phase structure of a resin material of this example was found to be random by observation with a transmission electron microscope as shown in FIG. 9.

Comparative Example 2

A resin material composed of only a copolymer was prepared without addition of a particle. As a copolymer, Daiamid (Disel, Hules) was used.

A phase structure of a resin material of this Example was random.

Comparative Example 3

A resin material composed of only a copolymer was prepared without addition of a particle. As a copolymer, Estran C95A (manufactured by Takeda Verdishurethane kogyo) was used.

A phase structure of a resin material of this example was random.

Comparative Example 4

As a particle, talc and mica having surface area of 5.0 $m^2/g$ were used. These are a plate-like particle having an aspect ratio of 30 and a length of 5 $\mu m$.

As a copolymer, Tuftec H1013 was used as in Example 1.

According to the same other manners as those in Example 1, a resin composite material was prepared.

When the resultant resin composite material was observed with a transmission electron microscope, a phase structure was found random.

Obviously, numerous modifications and variations of the present invention are possible in light of the above teachings. It is therefore to be understood that within the scope of the appended claims, the invention may be practiced otherwise than as specifically described herein.

What is claimed is:

1. A resin composite material comprising a plurality of particles having a surface area of not less than 50 $m^2/g$ and at least (i) two different polymers or copolymers, or (ii) a copolymer comprising at least two different segments, wherein said particles are laminated with said polymers or said copolymer in the form of a phase structure, said phase structure comprising successive layers of polymers or successive layers of said segments of said copolymer, said layers having a unit thickness of 1 nm to 1000 nm.

2. The resin composite material according to claim 1, the particle has a needle-like, sheet-like, spherical or cylindrical shape.

3. The resin composite material according to claim 1, wherein the copolymer is a block copolymer or a graft copolymer comprising at least two kinds of segments.

4. The resin composite material according to claim 2, wherein the copolymer is a block copolymer or a graft copolymer comprising at least two segments.

5. The resin composite material according to claim 1, wherein the surface area of the particle is not less than 200 $m^2/g$.

6. The resin composite material according to claim 1, wherein the at least two polymers or the copolymer comprising at least two segments have such the tendency that homogenous polymers or segments aggregate to cause phase separation.

7. The resin composite material according to claim 1, wherein the polymers or the copolymer form a phase structure having an unit thickness of 5 nm to 1000 nm around the particle.

8. The resin composite material according to claim 1, wherein the particle is metal, ceramic, clay or carbon compound.

9. The resin composite material according to claim 1, wherein the particle is latex, cross-linked polymer or low-molecular organic crystal.

10. The resin composite material according to claim 1, wherein the at least two polymers are selected from the group consisting of two or more of polyamide, polyurethane, polyurea, polycarbonate, polyacetal, polyester, polyarylate, polyphenylene ether, polyphenylene sulfide, polyethylene, polypropylene, polybutene, polypentene, ethylene-propylene copolymer, ethylene-butene copolymer, polybutadiene, polyisoprene, hydrogenated polybutadiene, hydrogenated polyisoprene, ethylene-propylene-diene copolymer, ethylene-butene-diene copolymer, butyl rubber, polystyrene, styrene-butadiene copolymer, styrene-hydrogenated butadiene copolymer, polyether, polysulfone, polyketone, polyphthalamide, polyethernitrile, polybenzimidazole, polyimide, polycarbodiimide, fluorinated polymer such as polytetrafluorinated ethylene and the like, polyamideimide, polyetherimide, liquid crystal polymer, polysilane, silicone polymer such as polysiloxane and the like, and acrylic polymer such as polymethyl methacrylate and the like.

11. The resin composite material according to claim 1, wherein at least two polymers are selected from the group consisting of polyphenylene oxide and polystyrene, a combination of polypropylene and ethylene-propylene rubber, a combination of polypropylene and polybutene, a combination of polypropylene and styrene butadiene rubber, or a combination of polypropylene and hydrogenated styrene butadiene rubber.

12. The resin composite material according to claim 1, wherein the copolymer having at least two segments is a copolymer obtained by polymerizing at least two members selected from the group consisting of polyamide, polyurethane, polyurea, polycarbonate, polyacetal, polyester, polyarylate, polyphenylene ether, polyphenylene sulfide, polyethylene, polypropylene, polybutene, polypentene, ethylene-propylene copolymer, ethylene-butene copolymer, polybutadiene, polyisoprene, hydrogenated polybutadiene, hydrogenated polyisoprene, ethylene-propylene-diene copolymer, ethylene-butene-diene copolymer, butyl rubber, polystyrene, styrene-butadiene copolymer, styrene-hydrogenatedbutadiene copolymer, polyether, polysulfone, polyketone, polyphthalamide, polyethernitrile, polybenzimidazole, polyimide, polycarbodiimide, fluorinated polymer such as polytetrafluorinated ethylene and the like, polyamideimide, polyetherimide, liquid crystal polymer, polysilane, silicone polymer such as polysiloxane and the like, and acrylic polymer such as polymethyl methacrylate and the like.

13. The resin composite material according to claim 1, wherein number-average molecular weight of the at least two polymers or the copolymer comprising at least two segments is 5,000 to 10,000,000.

14. The resin composite material according to claim 1, wherein a content of the particle is 0.1 to 200 parts by weight relative to 100 parts by weight of the polymers or the copolymer.

15. The resin composite material according to claim 1, wherein the particle is finely dispersed in the polymers or the copolymer.

16. The resin composite material according to claim 1, wherein the particle is layered clay and the polymers or the copolymer are intercalated between layers of the layered clays.

17. The resin composite material according to claim 1, wherein the resin composite material is a vibration damping material, a vibration isolating material, an electrically conductive material, a film material, an optical material, or an anti-magnetic material.

18. The resin composite material according to claim 1, wherein the phase structure is contained in the polymers or the copolymer in an amount of 25 to 100% by weight.

19. A resin composite material characterized in that the resin composite material according to claim 1 is added to a resin containing no part in which the phase structure is formed.

20. A resin composite material comprising a plurality of particles having a surface area of not less than 50 $m^2/g$ and at least (i) two different polymers or copolymers, or (ii) a copolymer comprising at least two different segments,
wherein said particles are laminated with said polymers or said copolymer in the form of a phase structure, said phase structure comprising successive layers of polymers or successive layers of said segments of said copolymer, said layers having a unit thickness of 1 nm to 1000 nm,
wherein the arrangement of said successive layers of said polymers or said successive layers of said segments of said copolymer is controlled by the particle.

21. The resin composite material of claim 1, wherein the minimum surface area of the particles is at least 740 $m^2/g$.

22. The resin composite material of claim 1, wherein the minimum surface area of the particles is at least 100 $m^2/g$.

23. The resin composite material of claim 1, wherein the minimum surface area of the particles is at least 200 $m^2/g$.

24. The resin composite material of claim 1, wherein the minimum surface area of the particles is from 740 $m^2/g$ to 800 $m^2/g$.

25. The resin composite material of claim 1, wherein the particles are laminated with successive layers of at least two polymers or copolymers.

26. The resin composite material of claim 1, wherein the particles are laminated with a copolymer.

\* \* \* \* \*

UNITED STATES PATENT AND TRADEMARK OFFICE
CERTIFICATE OF CORRECTION

PATENT NO. : 6,541,557 B1
DATED : April 1, 2003
INVENTOR(S) : Naoki Hasegawa, et al.

It is certified that error appears in the above-identified patent and that said Letters Patent is hereby corrected as shown below:

<u>Title page,</u>
Item 57, ABSTRACT,
Line 7, "an unit" should read -- a unit --.

Signed and Sealed this

Ninth Day of September, 2003

JAMES E. ROGAN
*Director of the United States Patent and Trademark Office*